(12) United States Patent
Hartman et al.

(10) Patent No.: US 6,764,289 B1
(45) Date of Patent: Jul. 20, 2004

(54) FIXTURE FOR MANUFACTURING MAGNETS FOR A VOICE COIL MOTOR

(75) Inventors: Albert Hartman, Palo Alto, CA (US); Wendy Lorimer, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/390,133

(22) Filed: Sep. 3, 1999

Related U.S. Application Data

(63) Continuation-in-part of application No. 09/231,712, filed on Jan. 15, 1999, now Pat. No. 6,157,099.

(51) Int. Cl.[7] .................................................. B22F 3/02
(52) U.S. Cl. ........................................................ 425/78
(58) Field of Search ............................... 425/78; 419/2; 148/105, 108

(56) References Cited

U.S. PATENT DOCUMENTS

| | | | |
|---|---|---|---|
| 2,384,215 A | * | 9/1945 | Toulmin, Jr. ..................... 75/22 |
| 3,334,254 A | * | 8/1967 | Kober ........................... 310/156 |
| 3,898,599 A | * | 8/1975 | Reid et al. .................... 335/302 |
| 4,004,167 A | * | 1/1977 | Meckling ...................... 310/154 |
| 4,185,262 A | * | 1/1980 | Watanabe et al. ........... 335/302 |
| 4,547,758 A | * | 10/1985 | Shimizu et al. .............. 335/302 |
| 4,600,555 A | | 7/1986 | Shimizu |
| 4,628,809 A | * | 12/1986 | Das et al. .................... 100/208 |
| 4,678,634 A | * | 7/1987 | Tawara et al. ................. 419/30 |
| 4,818,305 A | * | 4/1989 | Steingroever ............... 148/103 |
| 4,888,512 A | | 12/1989 | Shimizu |
| 4,990,306 A | * | 2/1991 | Ohashi .......................... 419/28 |
| 5,145,614 A | * | 9/1992 | Kuroda .......................... 264/24 |
| 5,148,138 A | * | 9/1992 | Miyata ........................ 335/302 |
| 5,628,047 A | * | 5/1997 | Hiroyoshi ..................... 419/62 |
| 5,762,967 A | * | 6/1998 | Sagawa et al. ................. 425/3 |
| 5,861,696 A | * | 1/1999 | Hartman et al. ............. 310/156 |
| 6,157,099 A | * | 12/2000 | Hartman ........................ 310/13 |

OTHER PUBLICATIONS

Hitachi Rare–Earth Magnet Brochure, Hitachi Metal, Ltd., Front cover, p. 42 and Rear cover, date of publication unknown.

* cited by examiner

Primary Examiner—Daniel Jenkins
(74) Attorney, Agent, or Firm—James P. Broder; Steven G. Roeder

(57) ABSTRACT

A manufacturing fixture (11) for manufacturing a permanent magnet (24) for an actuator motor (20) of a disk drive (10) is provided herein. The manufacturing fixture (11) includes a fixture cavity (102) which receives the magnet powder (48) and an orientating device (108) which generates flux lines (110) which extend across the fixture cavity (102). The fixture cavity (102) includes a cavity axis (118), a cavity transition (116) and a cavity perimeter (124). Importantly, the flux lines (110) extend substantially transverse to the cavity axis (118) near the cavity transition (116) and the cavity perimeter (124) and substantially parallel with the cavity axis (118) intermediate the cavity transition (116) and the cavity perimeter (124). This allows for a magnet (24) having higher magnetic flux densities at the sides (54) (56) (58), and higher average magnetic flux densities in the magnet (24).

75 Claims, 11 Drawing Sheets

FIXTURE FOR MANUFACTURING MAGNETS FOR A VOICE COIL MOTOR

CROSS REFERENCE TO RELATED APPLICATION

This application is a continuation in part of U.S. patent application Ser. No. 09/231,712, filed on Jan. 15, 1999, now U.S. Pat. No. 6,157,099 entitled "SPECIALLY ORIENTED MATERIAL AND MAGNETIZATION OF PERMANENT MAGNETS", the contents of which are incorporated herein by reference.

FIELD OF THE INVENTION

The present invention relates to a fixture for manufacturing magnets. More specifically, the present invention relates to a fixture and method for pressing and orientating magnets for voice coil actuator motors.

BACKGROUND

Disk drives are widely used in computers and data processing systems for storing information in digital form. Disk drives typically utilize one or more rotating, storage disks and a plurality of data transducers to interact with each storage disk. An E-block having a plurality of spaced apart actuator arms retains the data transducers proximate each storage disk. An actuator motor moves the E-block and the data transducers relative to the storage disks.

The need to rapidly access information has led to disk drives having storage disks which are rotated at ever increasing speeds and an actuator motor which moves the E-block at ever increasing rates. Unfortunately, this typically results in increased heat, noise and power consumption of the disk drive.

FIG. 1A illustrates a rear perspective view of a portion of a prior art, rotary, voice coil actuator motor 10P. In this embodiment, a flat, trapezoidal shaped coil 12P is positioned between two permanent magnets 14P and two flux return plates 16P. The coil 12P is secured to the E-block (not shown in FIG. 1A). Current passing through the coil 12P causes the coil 12P to move relative to the permanent magnets 14P to move the E-block.

One factor which effects efficiency of the actuator motor 10P is the strength of the magnets 14P. In the prior art actuator motor 10P illustrated in FIG. 1A, the magnets 14P include magnetization lines 18P (illustrated as arrows) which are oriented substantially perpendicular to the coil 12P. In this embodiment, the magnets 14P are made of a magnetic powder which is also oriented substantially perpendicular to the coil 12P.

FIG. 1B illustrates a cross-sectional view of a prior art fixture 22P which can be used to manufacture the magnet 14P. The prior art fixture 22P includes a fixture body 24P, an upper punch 26P, and a lower punch 28P. This fixture body 24P defines a cavity for receiving magnet powder to form the magnet 14P. An orientating coil 30P creates a magnet field 32P having flux lines which orient the magnet powder in the magnet 14P.

Unfortunately, the strength of the magnets 14P illustrated in FIG. 1A vary approximately 14–20 percent across the stroke of the coil 12P. More specifically, the strength of the magnets 14P is high, near the center and drops near the sides of the magnets 14P. This non-linearity causes difficulty in precisely moving the coil 12P. Inaccurate positioning of the coil 12P leads to data transfer errors between the data transducers and the storage disks.

In light of the above, it is an object of the present invention to provide an improved magnet and a fixture for making the improved magnet. It is another object to provide a fixture for manufacturing a magnet which is relatively easy to use. Yet another object is to provide a method for manufacturing a magnet which significantly improves the strength and performance of the magnet.

SUMMARY

A manufacturing fixture which satisfies these needs is provided herein. The manufacturing fixture is useful for manufacturing a magnet from a magnet powder for a motor. The manufacturing fixture includes a fixture body and an orientating device. The fixture body includes a fixture cavity for receiving the magnetic powder. The orientating device aligns the magnetic powder in the fixture cavity.

The fixture cavity includes a cavity axis, a first cavity segment, second cavity segment, and a cavity transition between the first cavity segment and the second cavity segment. Uniquely, the orientating device creates a magnetic field having flux lines which extend (1) substantially transverse to the cavity axis near the cavity transition, (2) highly angled relative to the cavity axis near a perimeter of the fixture cavity and, (3) substantially parallel to the cavity axis intermediate the perimeter and the cavity transition.

The flux lines orient the magnet powder into a unique powder pattern which includes first region powder lines in a first region of the magnet which are substantially parallel with a first region axis and second region powder lines in a second region of the magnet which are angled relative to the first region axis.

This powder pattern subsequenuy facilitates a unique magnetization pattern in the magnet. This magnetization pattern results in higher magnetic flux densities throughout the magnet, higher magnetic flux densities at the parts of the magnet which interact with a coil of the motor, and higher average magnetic flux densities in the magnet.

Additionally, the higher magnetic flux densities at the sides of the magnet body, i.e. a greater radius, results in higher torques on the coil of the motor. This enables the magnet to generate more force from a given amount of current in the coil and increases the efficiency of the motor. This also reduces the amount of power consumed by the motor, reduces the amount of heat and noise generated by the motor during operation and increases operational time of the motor for a given battery charge. Further, the size of the magnet can be reduced for a given force requirement. These considerations are particularly important for computer disk drives, which often operate in heat and noise sensitive environments, or on battery power.

The present invention is also a method for manufacturing a magnet. The method includes the steps of positioning a magnet powder in the fixture cavity of the manufacturing fixture and aligning a portion of the magnet powder in the fixture cavity with a magnetic field to form the powder pattern outlined above. The method can also include the step of magnetizing the magnet to include the magnetization pattern outlined above.

Importantly, the manufacturing fixture is used to make a magnet having a unique powder pattern. This powder pattern allows the magnet to accept a unique magnetization pattern which increases the amount of force generated for a given amount of current in the coil. This increases the efficiency, accuracy and performance of the actuator motor, thereby reducing data seek times and amount of power consumed by the actuator motor.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
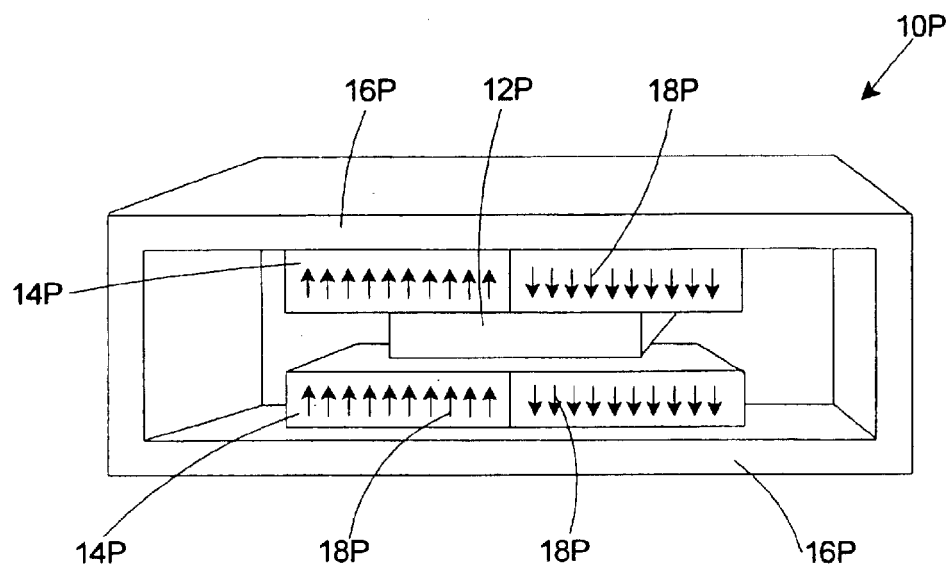
FIG. 1A is a perspective view of a portion of a prior art actuator motor.
Figure 1B:
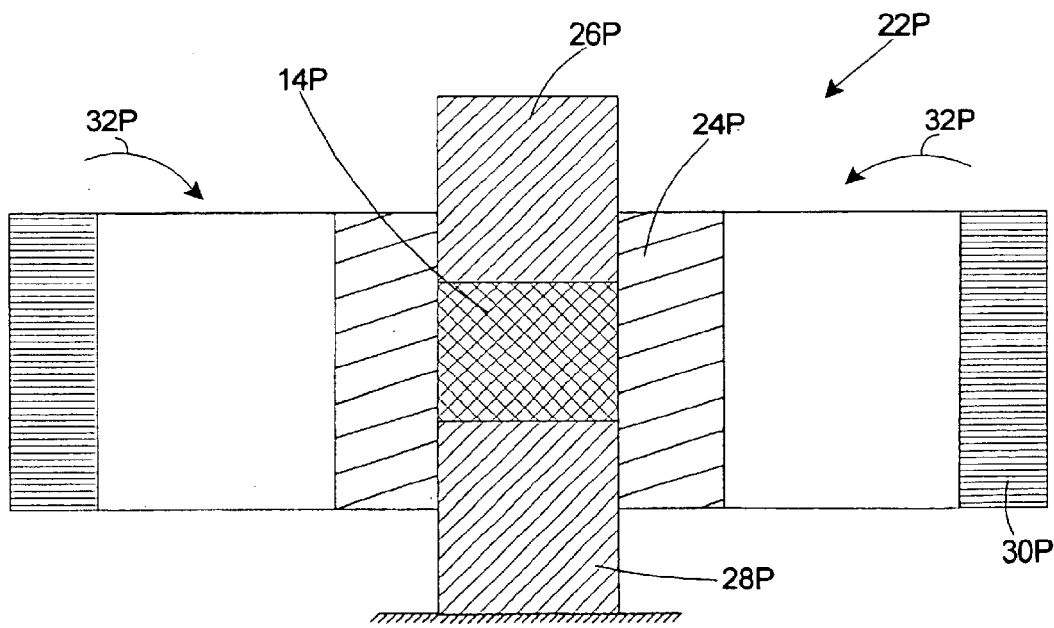
FIG. 1B is a cross-sectional view of a prior art fixture.

The present invention is directed to a manufacturing fixture 11 (illustrated in FIG. 19) for manufacturing magnets 24. As provided below, magnets 24 produced by the manufacturing fixture 11 have improved performance characteristics including higher average magnetic flux densities across the magnet 24.

The manufacturing fixture 11 is particularly useful for manufacturing magnets 24 for an actuator motor 20 for a disk drive 10. Alternately, the manufacturing fixture 11 and process described herein can be used to make magnets for other types of motors.

Figure 2:
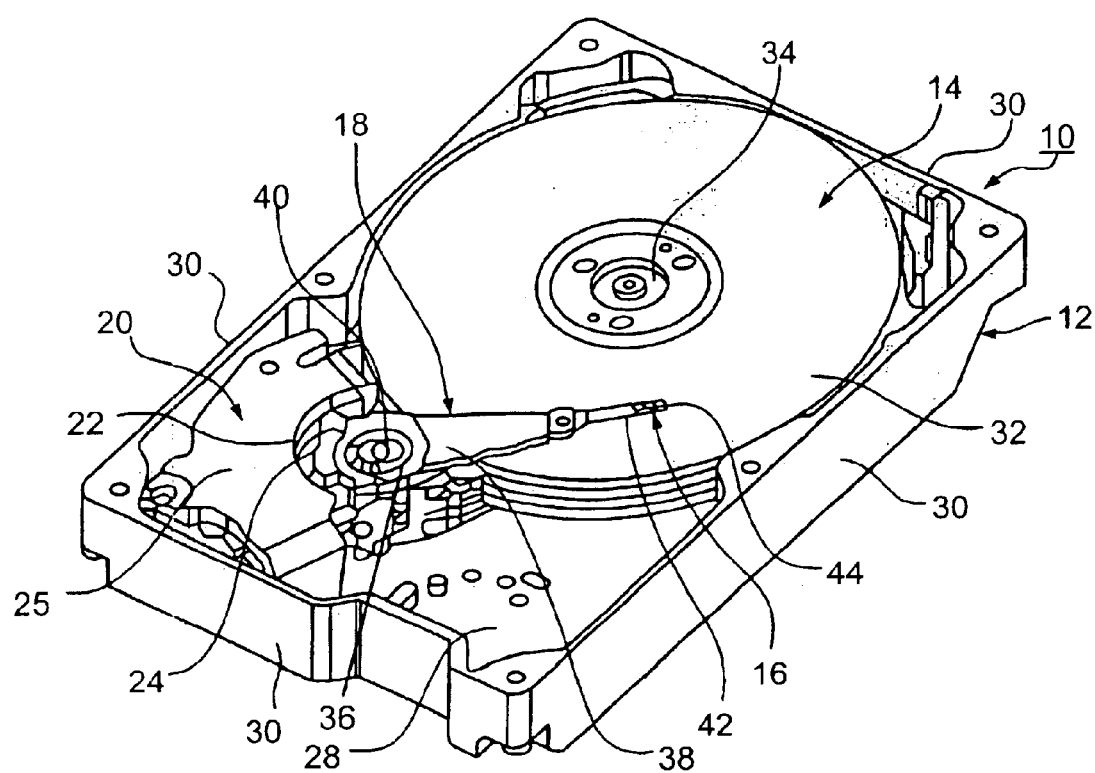
FIG. 2 is a perspective view of a disk drive having features of the present invention.
Figure 3:
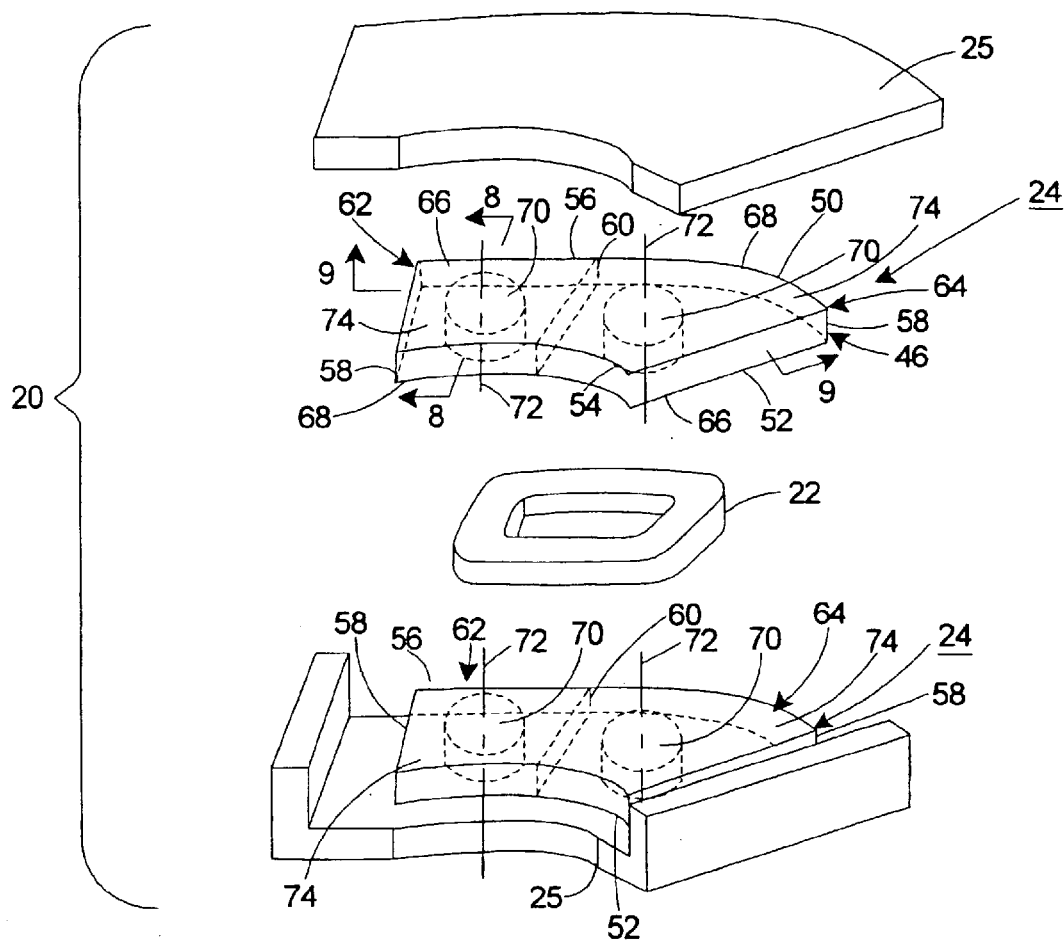
FIG. 3 is an exploded perspective view of a portion of an actuator motor having features of the present invention.

FIG. 2 illustrates a disk drive 10 having a disk housing 12, a disk assembly 14, transducer assemblies 16, an E-block 18 and the actuator motor 20. Referring to FIG. 3, the actuator motor 20 includes an actuator coil 22, one or more permanent magnets 24, and one or more flux return plates 25.

As an overview, the manufacturing fixture 11 allows each magnet 24 to accept a magnetization pattern 26 (illustrated in FIGS. 10–18) which increases the amount of force generated by each magnet 24 on the actuator coil 22 of the actuator motor 20 from a given amount of current in the actuator coil 22. This allows the actuator motor 20 to quickly move the E-block 18 and the transducer assemblies 16 to decrease the data recovery time. Further, the increased efficiency of the actuator motor 20 reduces energy consumption and increases operational time of the actuator motor 20 for a given battery charge for a portable unit. Moreover, the magnets 24 can be used with thinner flux return plates 25.

A detailed description of the various components of a disk drive 10 is provided in U.S. Pat. No. 5,208,712, issued to Hatch et al, and assigned to Quantum Corporation, the Assignee of the present invention. The contents of U.S. Pat. No. 5,208,712, are incorporated herein by reference. Accordingly, this discussion is limited to the aspects of the disk drive 10 which particularly relevant.

The drive housing 12 retains the various components of the disk drive 10. The drive housing 12 is formed with a cover (not shown), a base 28 and spaced apart side walls 30. The disk assembly 14 includes one or more storage disks 32 mounted to a spindle hub 34. A spindle motor (not shown) rotates the spindle hub 34 and the storage disks 32 at a constant angular velocity.

The E-block 18 includes a tubular actuator hub 36 and one or more actuator arms 38 which cantilever away from the actuator hub 36. The actuator hub 36 rotates on an actuator shaft 40 which is secured to the base 28. The actuator arms 38 rotate with the actuator hub 36 and position the transducer assemblies 16 between the disks 32. The number and spacing of the actuator arms 38 varies according to the number and spacing of the disks 32.

The transducer assembly 16 typically includes a load beam 42 used to attach each data transducer 44 to one of the actuator arms 38. Typically, one data transducer 44 interacts with a single storage surface on one of the storage disks 32 to access or transfer information to the storage disk 32.

The actuator motor 20 precisely moves the E-block 18 and the transducer assembly 16 relative to the storage disks 32. In the embodiment shown in the Figures, the actuator motor 20 is a rotary voice coil actuator. In this embodiment, the flat, trapezoidal shaped actuator coil 22 is attached to the actuator hub 36. The actuator coil 22 is disposed between two permanent magnets 24 and the flux return plates 25. The actuator coil 22 is separated from the permanent magnets 24 by an air gap. The flux return plates 25 serve as a return path for magnetic fields from the magnet 24 and may be formed of soft iron or steel. Current passing through the actuator coil 22 causes the actuator coil 22 to move relative to the magnets 24. This causes the actuator hub 36 and the actuator arms 38 to rotate. In an alternate embodiment, the actuator motor 20 could be a linear actuator motor (not shown) which moves radially with respect to the disks 32.

FIG. 3, illustrates an exploded view of an actuator motor 20 which utilizes two magnets 24. More specifically, one of the magnets 24 in this embodiment is positioned above the actuator coil 22 and one of the magnets 24 is positioned below the actuator coil 22. Alternately, the actuator motor 20 could include a single magnet positioned either above or below the actuator coil 22. Each magnet 24 is defined by a curved or substantially arched shaped magnet body 46 which is made of a magnet powder 48 (shown in FIGS. 4–9). The magnet body 46 is defined by a substantially flat top surface 50, a spaced apart, substantially flat bottom surface 52, an arc shaped inner side 54, an arc shaped outer side 56, and a pair of spaced apart radial sides 58. A transition zone 60 vertically divides the magnet body 46 into a first segment 62 and a second segment 64 which are side-by-side. The transition zone 60 is represented by dashed lines. Each of the segments 62, 64, when magnetized, has a north pole 66 and a south pole 68. The poles 66, 68, of the first and second segments 62, 64, are inverted.

In the embodiment illustrated in the Figures, the magnet body 46 is a unitary structure. Alternately, the first and second segments 62, 64 can be distinct structures which are made independently and subsequently positioned side-by-side to form the magnet body 46.

Each segment 62, 64, includes a first region 70 (represented by dashed lines in FIGS. 3, 8, 9, 17, and 18) having a first region axis 72 which extends between the north pole 66 and the south pole 68 and a second region 74 which encircles and surrounds the first region 70. The first region 70 illustrated in the FIGS. 3, 8, 9, 17, and 18 is shaped somewhat similarly to a circular cylinder and has a circular cross-section. The second region 74 is arched shaped and is defined by a portion of the top surface 50, a portion of the bottom surface 52, a portion of the inner side 54, a portion of the outer side 56, one of the radial sides 58 and the transition zone 60. Basically, second region 74 is defined by the perimeter of each segment 62, 64. The size and shape of the first region 70 and the second region 72 can be varied according to the design requirements of the magnet 24.

Importantly, the magnet body 46 is manufactured utilizing the manufacturing fixture 11 which enhances the ability of the magnet body 46 to retain the unique magnetization pattern 26. The manufacturing process includes aligning and orientating the magnet powder 48 during manufacturing to form a unique powder pattern 75 with the manufacturing fixture 11. A representative portion of one embodiment of the resulting powder pattern 75 is illustrated in FIGS. 4–9.

The magnet powder 48 is aligned into the unique powder pattern 75 to enhance ability of the magnet body 46 to retain the magnetization pattern 26. The alignment of the magnet powder 48 in the magnet body 46 is designed to correspond to the desired magnetization pattern 26.

Figure 4:
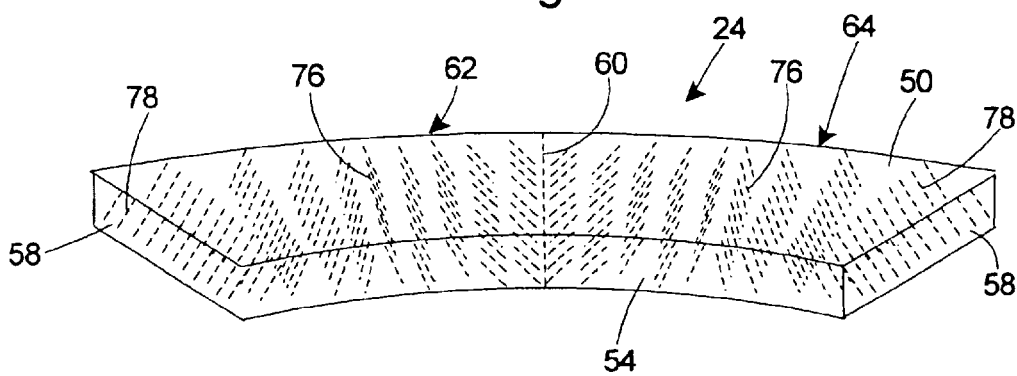
FIG. 4 is a top perspective view of a portion of a magnet including a powder pattern having features of the present invention.
Figure 5:
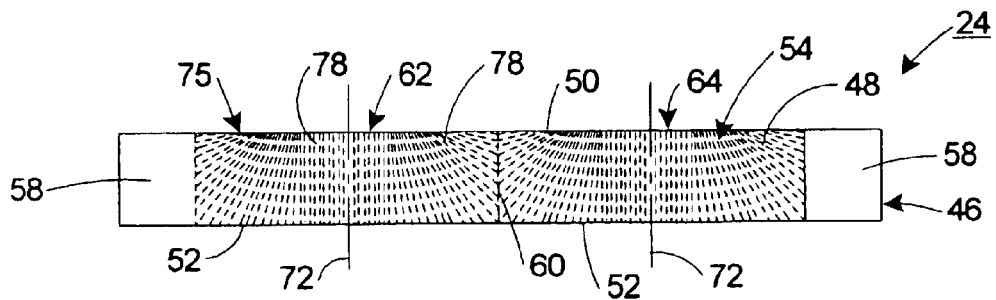
FIG. 5 is a front plan view of a lower magnet illustrating a portion of the powder pattern on the inner side.
Figure 6:
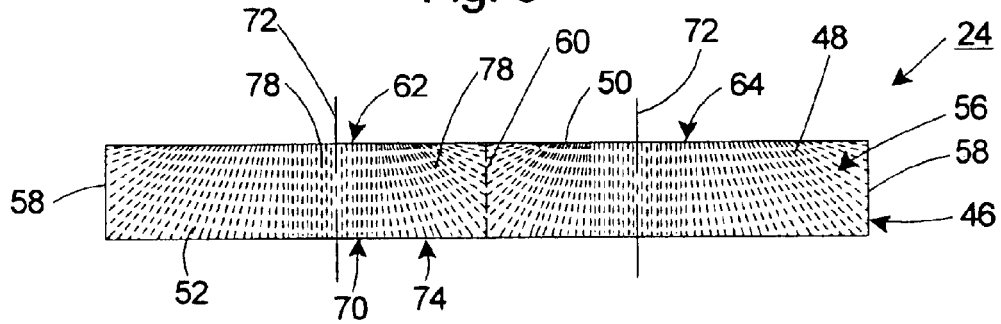
FIG. 6 is a rear plan view of the lower magnet of FIG. 5 illustrating a portion of the powder pattern on the outer side.
Figures 7, 8:
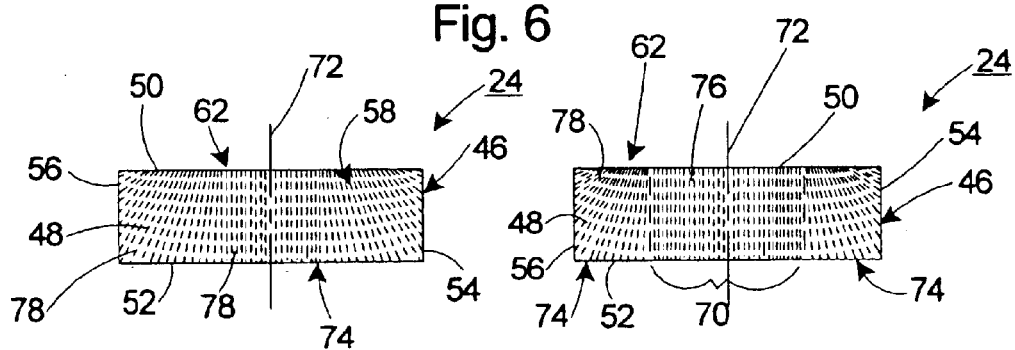
FIG. 7 is a side plan view of the lower magnet of FIG. 5 illustrating a portion of the powder pattern on a radial side.
FIG. 8 is a view of the powder pattern as seen from Line 8—8 of FIG. 3.
Figure 9:
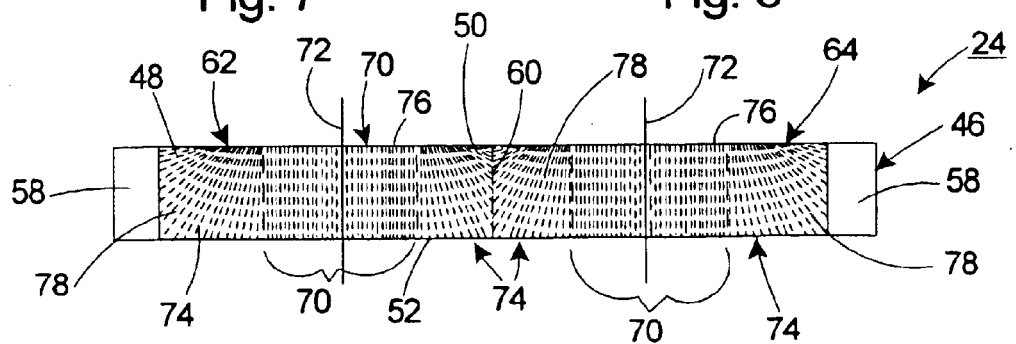
FIG. 9 is a view of the powder pattern as seen from Line 9—9 of FIG. 3.
Figure 10A:
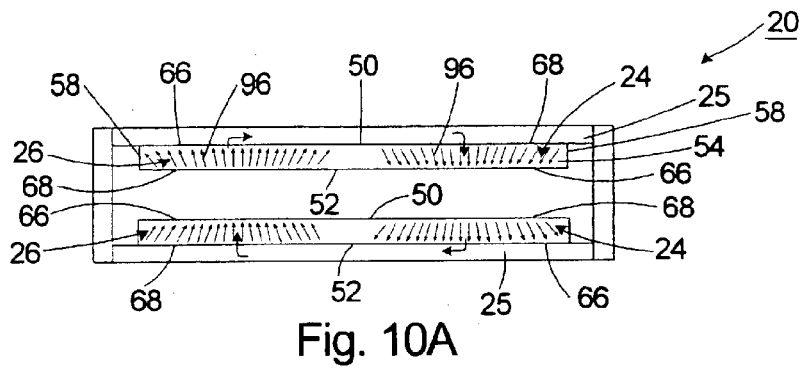
FIG. 10A is a front plan view of a first embodiment of a portion of an actuator motor, without coil, illustrating a portion of a magnetization pattern.
Figure 10B:
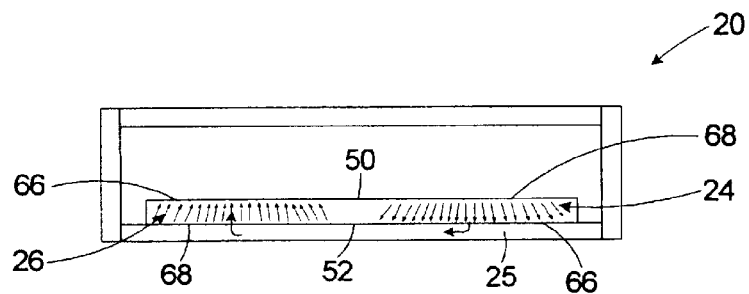
FIG. 10B is a front plan view of a second embodiment of a portion of an actuator motor, without coil, illustrating a portion of a magnetization pattern.

The term powder pattern 75 as used herein shall mean the pattern which is formed by the oriented and aligned magnet powder 48 in the magnet 24. The powder pattern 75 is only visible at a microscopic level. The magnet powder 48 is illustrated in FIGS. 4–9 to facilitate understanding of the present invention. More specifically, FIG. 4 illustrates the powder pattern 75 from a perspective view, FIG. 5 illustrates the powder pattern 75 when looking towards the inner side 54 of the magnet body 24, FIG. 6 illustrates the powder pattern 75 when looking towards the outer side 56, FIG. 7 illustrates the powder pattern 75 when looking a radial side 58, FIG. 8 illustrates the powder pattern 75 as seen from Line 8—8 of FIG. 3 and FIG. 9 illustrates the powder pattern 75 as seen from Line 9—9 of FIG. 3.

The powder pattern 75 for each segment 62, 64, includes first region powder lines 76 (illustrated in FIGS. 8 and 9) in the first region 70 and second region powder lines 78 in the second region 74. The first region powder lines 76 are substantially parallel with the first region axis 72 while the second region powder lines 78 are angled relative to the first region axis 72. Thus, the powder pattern 75 is defined by substantially vertical first region powder lines 76 in the first region 70 and angled second region powder lines 78 in the second region 74.

Referring to FIGS. 8–9, the first region powder lines 76 near the second region 74 are still substantially parallel to the first region axis 72. It should be recognized, however, that the first region powder lines 76 tend to angle slightly relative to the first region axis 72 as the radial distance from the first region axis 72 increases. Further, the angle of the second region powder lines 78 increases as the radial distance from the first region axis 72 increases. Stated another way, the second region powder lines 78 near the first region 70 are almost parallel with the first region axis 72 while the second region powder lines 78 near the sides 54, 56, 58, are more angled. In particular, the second region powder lines 78 near the sides 54, 56, 58 can be angled between approximately 20 and 90 degrees relative to the first region axis 72.

Preferably, the second region powder lines 78 throughout the entire second region 74 are angled relative to the first region axis 72. More specifically, the second region powder lines 78 for each second region 74 are angled relative to the first region axis 72 near the inner side 54, the outer side 56, the radial side 58 and the transition zone 60. The second region powder lines 78 near the sides 54, 56, 58 and the transition zone 60 are substantially perpendicular or transverse to the first region axis 72.

It should be noted that in the first segment 62, when moving from the bottom surface 52 to the top surface 50, the second region powder lines 78 are angled towards the first region axis 72. Alternately, in the second segment 64, when moving from the bottom surface 52 to the top surface 50, the second region powder lines 78 are angled away from the first region axis 72.

Figure 11:
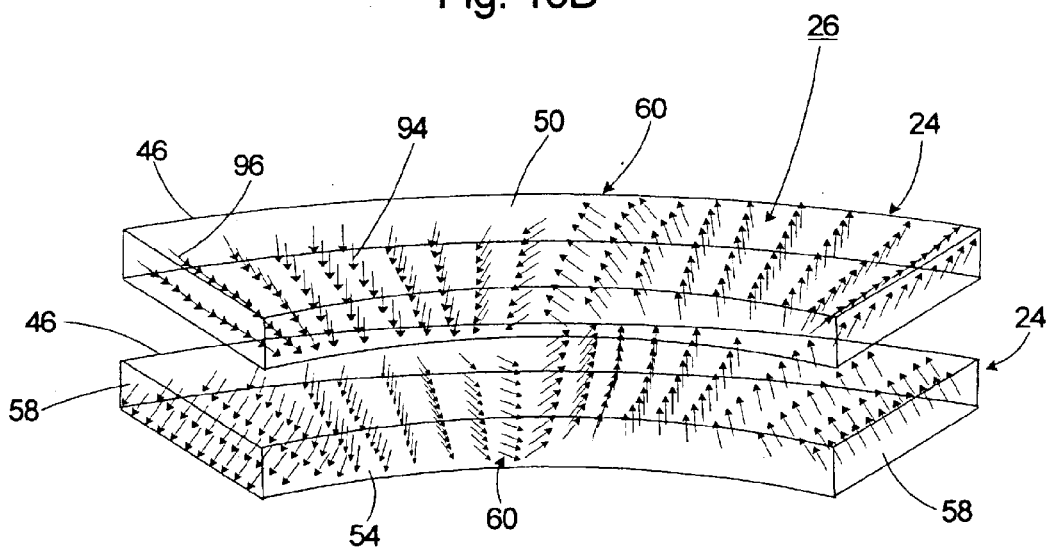
FIG. 11 is a top perspective view of a pair of magnets, illustrating a portion of the magnetization pattern.
Figure 12:
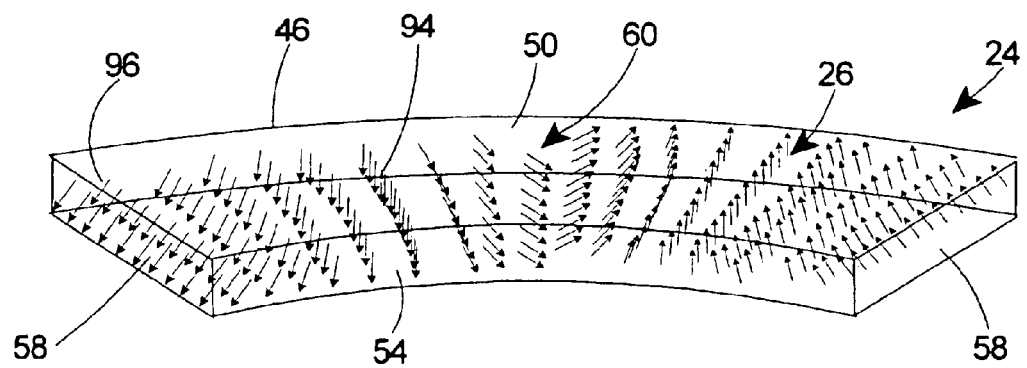
FIG. 12 is a top perspective view of a single magnet illustrating a portion of the magnetization pattern.
Figure 13:
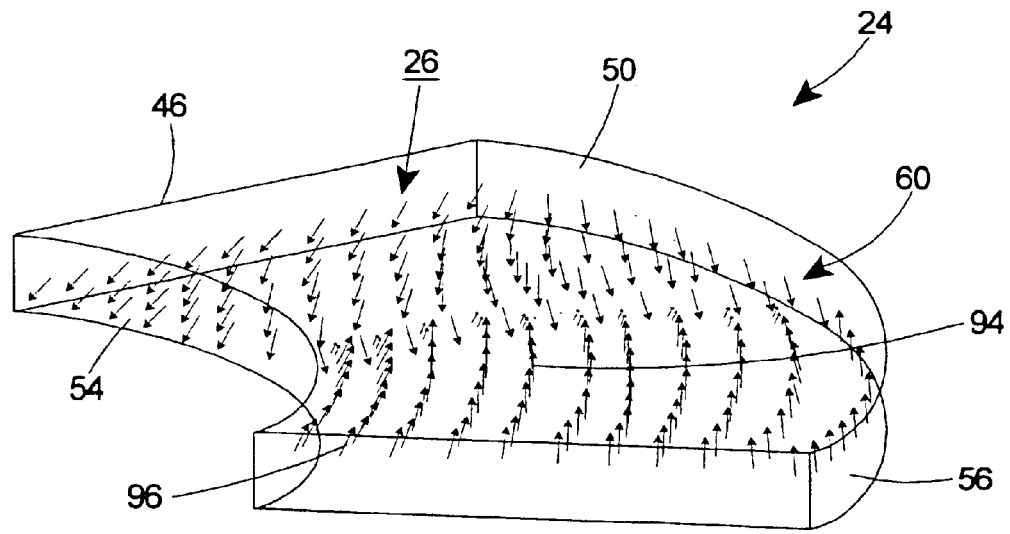
FIG. 13 is a side perspective view of the magnet of FIG. 12.
Figure 14:
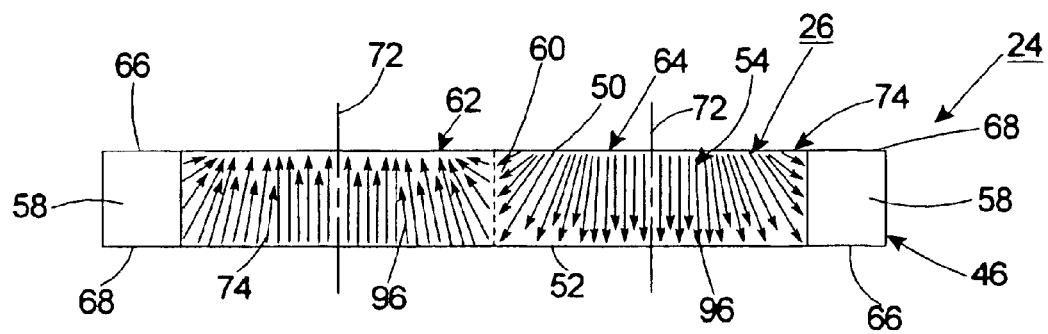
FIG. 14 is a front plan view of a magnet illustrating a portion of the magnetization pattern on the inner side.
Figure 15:
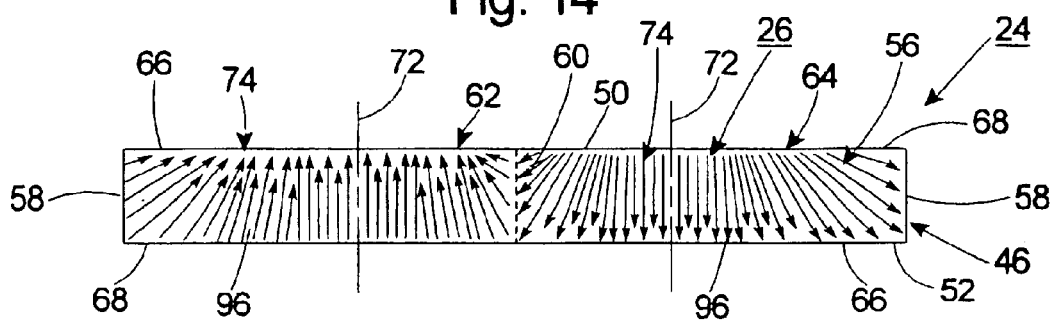
FIG. 15 is a rear plan view of the magnet of FIG. 14 illustrating a portion of the magnetization pattern on the outer side.
Figures 16, 17:
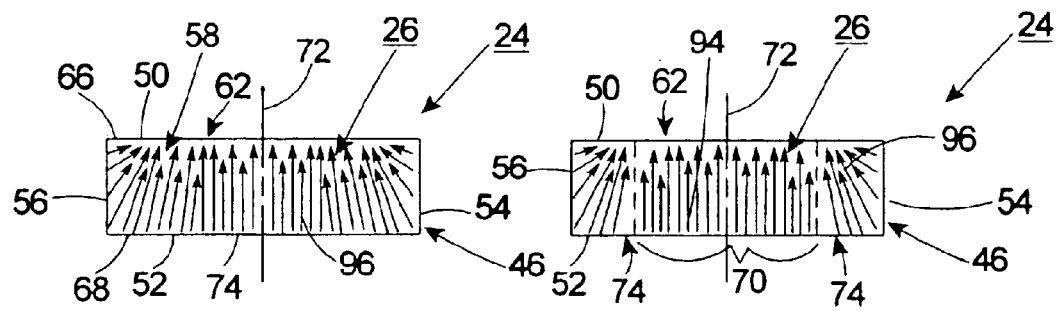
FIG. 16 is a side plan view of the magnet of FIG. 14 illustrating a portion of the magnetization pattern on a radial side.
FIG. 17 is a view of the magnetization pattern as seen from Line 8—8 FIG. 3.
Figure 18:
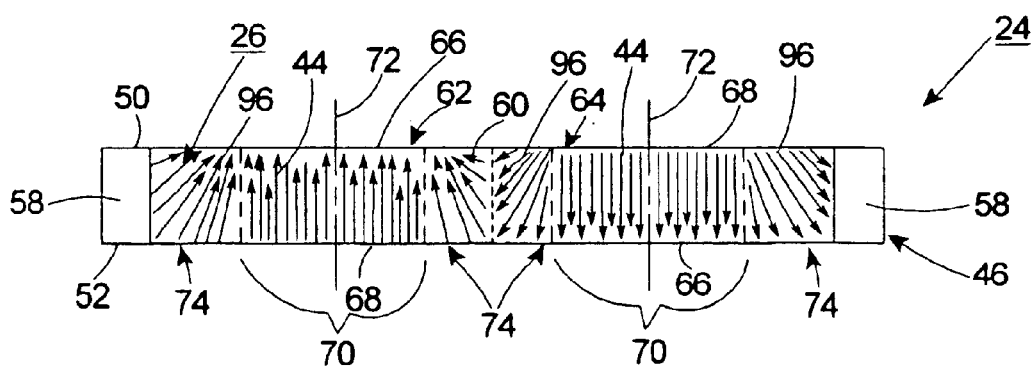
FIG. 18 is a view of the magnetization pattern as seen from Line 9—9 of FIG. 3.

To increase the efficiency of the actuator motor 20, the magnet body 46 is preferably magnetized to have the magnetization pattern 26 illustrated in FIGS. 10–18. As way of background, FIG. 10A illustrates a portion of an actuator motor 20 and the magnetization pattern 26 in a couple of magnets 24 used in the actuator motor 20, FIG. 10B illustrates another embodiment of an actuator motor 20 and the magnetization pattern 26 in a single magnet 24 used in the actuator motor 20, FIG. 11 is a top perspective view of a pair of magnets 24 illustrating the magnetization pattern 26, FIG. 12 is a top perspective view of a single magnet 24, FIG. 13 is a side perspective view of the magnet 24, FIG. 14 illustrates the magnetization pattern 26 when looking towards the inner side 54 of the magnet body 24, FIG. 15 illustrates the magnetization pattern 26 when looking towards the outer side 56, FIG. 16 illustrates the magnetization pattern 26 when looking a radial side 58, FIG. 17 illustrates the magnetization pattern 26 as seen from Line 8—8 of FIG. 3 and FIG. 18 illustrates the magnetization pattern 26 as seen from Line 9—9 of FIG. 3.

Specifically, each segment 62, 64 of the magnet 24 includes a magnetization pattern 26 having (i) first region magnetization lines 94 (illustrated in FIGS. 17 and 18) in the first region 70 which are substantially parallel with the first region axis 72 and (ii) second region magnetization lines 96 in the second region 74 which are angled relative to the first region axis 72.

Referring to FIGS. 17 and 18, the first region magnetization lines 94 near the second region 74 are still generally parallel to the first region axis 72. It should be recognized, however, that the first region magnetization lines 94 tend to angle slightly relative to the first region axis 72 as the radial distance from the first region axis 72 increases. Similarly, a second region magnetization line 96 orientation gradient exists in the second region 74 as the radial distance away from the first region axis 74 increases. More specifically, for each second region 74, the second region magnetization lines 92 near the first region 70 are almost parallel with the first region axis 72 while the second region magnetization lines 92 away from the first region 70 are more angled. Stated another way, the second region magnetization lines 92 for each second region 74 transfer from being almost vertical near the first region 70 to severely angled away from the first region 70. The angle of the second region magnetization lines 92 increases as the distance from the first region axis 72 increases. In particular, the second region magnetization lines 92 near the sides 54, 56, 58 and the transition zone 60 can be between approximately 20 and 90 degrees relative to the first region axis 72. Typically, the second region magnetization lines 92 near the transition zone 60 are perpendicular to the first region axis 72.

Preferably, the second region magnetization lines 92 throughout the entire second region 74 are angled relative to the first region axis 72. More specifically, the second region magnetization lines 92 for each second region 74 are angled relative to the first region axis 72 near the inner side 54, the outer side 56, each radial side 58 and the transition zone 60.

As discussed above, the magnet powder 48 is aligned into the powder pattern 75 to enhance the ability of the magnet body 46 to retain the magnetization pattern 26. A comparison of FIGS. 5–9 illustrates that the alignment of magnet powder 48 in the powder pattern 75 is somewhat similar to the alignment of the magnetization pattern 26 illustrated in FIGS. 14–18. As provided herein, the alignment of the magnet powder 48 in the magnet body 46 is designed to correspond to alignment of the magnetization lines 94, 96 in the magnetization pattern 26.

Figure 19:
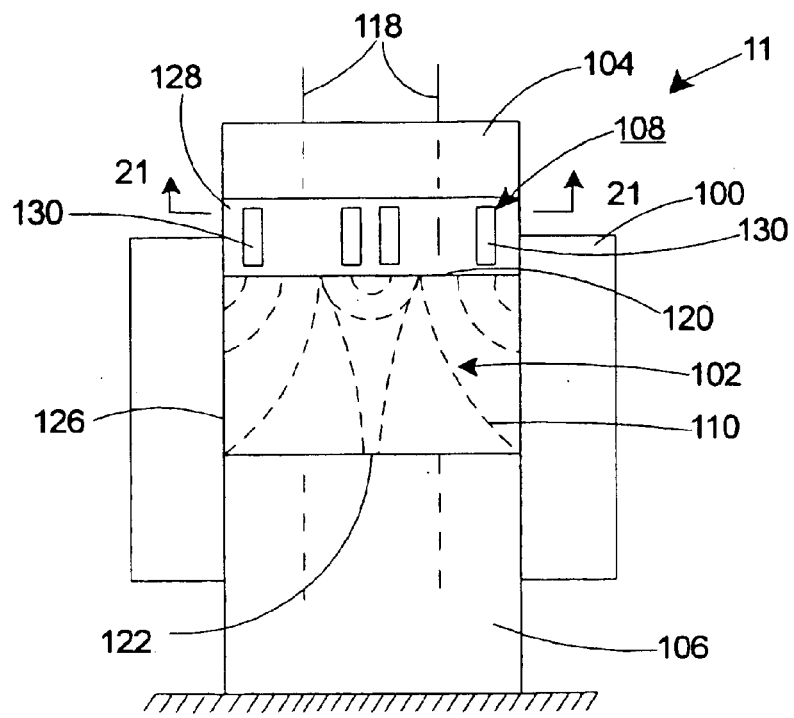
FIG. 19 is a side plan illustration of a manufacturing fixture having features of the present invention.

The magnet powder 48 is preferably formed into the magnet body 46 in the manufacturing fixture 11 utilizing powder metallurgy processes. Referring to FIG. 19, the manufacturing fixture 11 includes a fixture body 100 which defines a fixture cavity 102, an upper punch 104, a lower punch 106 and an orientating device 108. The upper punch 104 and lower punch 106 are movable relative to each other to compress the magnet powder 48 (not shown in FIG. 19) in the fixture cavity 102, while the orientating device 108 orientates the magnetic powder 48. In the embodiment illustrated, the fixture cavity 102 is arched or curved shaped. In a typical powder metallurgy process, the magnet powder 48 (not shown in FIG. 19) is initially added to the fixture cavity 102. Subsequently, the magnet powder 48 is compressed in the fixture cavity 102 with the upper punch 104 and lower punch 106 to form a pressed magnet body 46 (not shown in FIG. 19). Next, the magnet body 46 is removed from the fixture cavity 102 and heated.

Importantly, during pressing of the magnet powder 48, the magnet powder 48 is orientated into the powder pattern 75 with the orientating device 108. More specifically, the orientating device 108 generates a magnetic field having flux lines 110 which extend across the fixture cavity 102 to create the powder pattern 75. The flux lines 110 provided in FIG. 19 are merely an example of the thousands of flux lines which extend across the fixture cavity 102. Typically, the flux lines 110 are used to orient the magnet powder 48 prior to and during the compression of the magnet powder 48 in the fixture cavity 102.

Figure 20A:
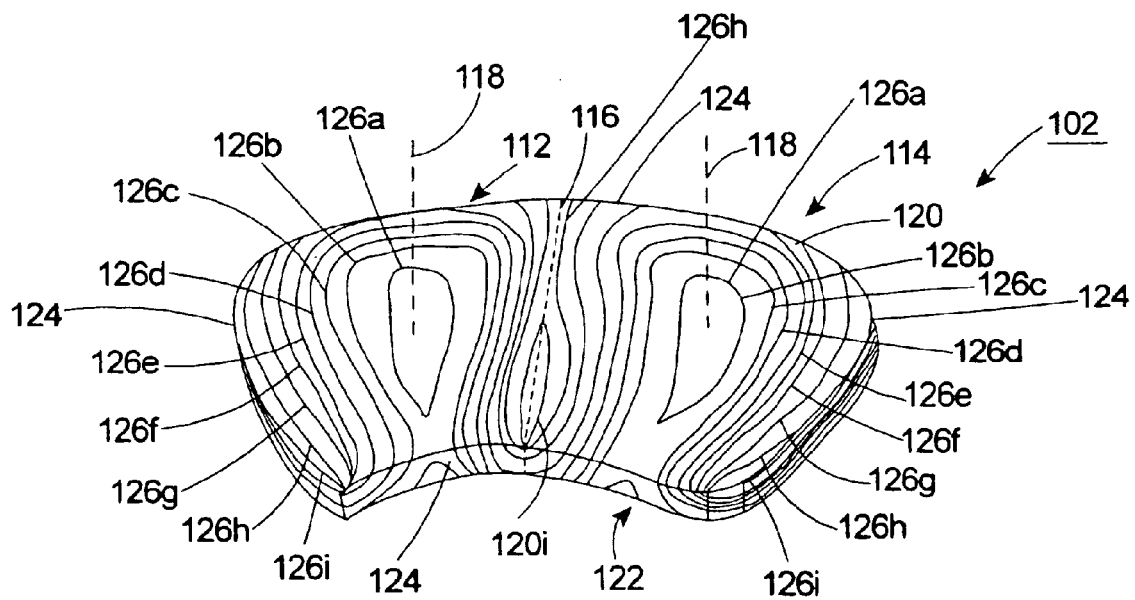
FIG. 20A is a top perspective illustration of the shape of the fixture cavity, including a plurality of curves which illustrate the orientation of the flux lines, the orientation of the powder pattern, and the orientation of the magnetization pattern.

FIG. 20A provides a perspective illustration of the shape of one embodiment of the fixture cavity 102. It should be recognized that the fixture cavity 102 illustrated is shaped substantially similar to one magnet 24. However, the fixture cavity 102 is slightly larger than the magnet 24 to account for shrinkage during manufacturing. Alternately, for example, the fixture cavity 102 could be shaped substantially similar to one of the segments 62, 64 of the magnet 24.

The fixture cavity 102 includes a first cavity segment 112, a second cavity segment 114, a cavity transition 116, and a pair of cavity axes 118 which extend through each cavity segment 112, 114. The fixture cavity 102 is bounded by an upper side 120, a lower side 122 and a cavity perimeter 126. The first cavity segment 112 and the second cavity segment 114 are side by side and are separated by the cavity transition 116. Each cavity axis 118 is substantially parallel with the first region axis 72. Further, each cavity axis 118 illustrated in the Figures is substantially vertical and perpendicular to the sides 120, 122.

FIG. 20A includes a plurality of curves designated 126a–I which illustrate the approximate angle of the flux lines 110 (not shown in FIG. 20A) in the fixture cavity 102 relative to each cavity axis 118. More specifically, each curve 126a–I in each cavity segment 112, 114 represents an approximate area in the fixture cavity 102 in which the angle of the flux lines 110 relative to each cavity axis 118 is approximately the same. For example, curves 126a represent the area in the fixture cavity 102 in which the flux lines 110 are at an approximately 5 degree angle relative to each cavity axis 118. Curves 126b represent the area in the fixture cavity 102 in which the flux lines 110 are at an approximately 15 degree angle relative to each cavity axis 118. Curves 126c represent the area in the fixture cavity 102 where the flux lines 110 are approximately at a 25 degree angle relative to each cavity axis 118. Curves 126d represent an approximate area where the flux lines 110 are approximately at a 35 degree angle relative to each cavity axis 118. Curves 126e represent an approximate area where the flux lines 110 are approximately at a 45 degree angle relative to each cavity axis 118. Curves 126f represent an approximate area in which the flux lines 110 are approximately at a 55 degree angle relative to each cavity axis 118. Curves 126g represent an approximate area where the flux lines 110 are approximately at a 65 degree angle relative to each cavity axis 118. Curves 126h represents an approximate area where the flux lines 110 are approximately at a 75 degree angle relative to each cavity axis 118. Curves 126i represent an approximate area where the flux lines 110 are approximately at an 85 degree angle relative to each cavity axis 118.

As illustrated by the curves 126a–i in FIG. 20A, the flux lines 110 extend almost transverse to each cavity axis 118 at the perimeter 124 and the cavity transition 116 and almost parallel to the cavity axis 118 intermediate the cavity perimeter 124 and the cavity transition 116. The example provided in FIG. 20A is merely exemplary of a pattern of flux lines which can be used with the present invention.

It should be noted that alignment of the flux lines 110, the alignment of magnet powder 48 in the powder pattern 75 and the alignment of the magnetization pattern 26 are preferably substantially the same, accounting for changes which occur during manufacturing, such as sintering, pressing and grinding. More specifically, to make the powder pattern 75 illustrated in FIGS. 5–9, the flux lines 110 would extend through the fixture cavity 102 in a somewhat similar fashion. Thus, the alignment of the flux lines 110 in the fixture cavity 102 is designed to correspond to the alignment of the magnet powder 48 in the magnet body 46 and the alignment of the magnetization lines 94, 96 in the magnetization pattern 26.

Figure 20B:
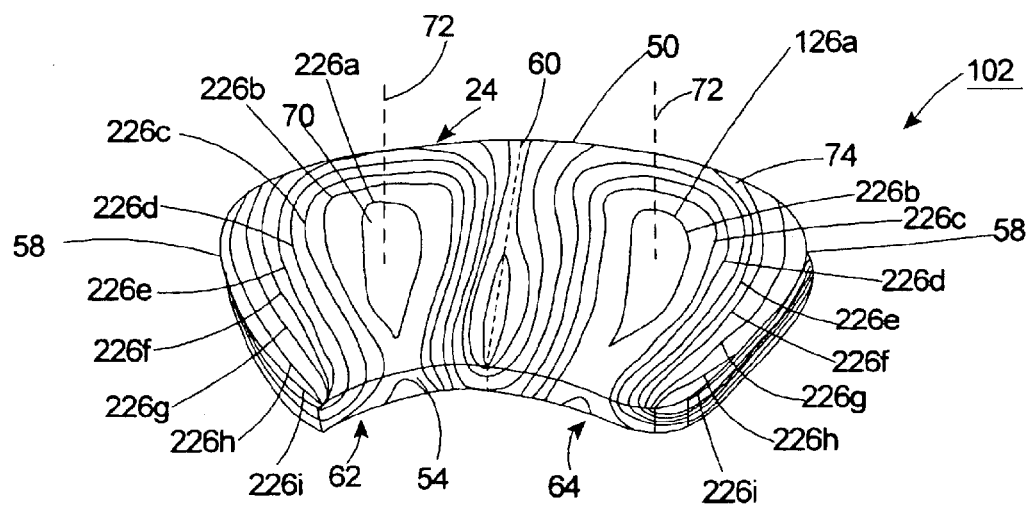
FIG. 20B is a top perspective illustration of a magnet including a plurality of curves which illustrate the orientation of the powder pattern.

FIG. 20B illustrates a perspective view of a magnet 24 having a plurality of curves designated 226a–I which illustrate the shape of a power pattern 75 which is made by the fixture 11. More specifically, curves 226a–I illustrate the angle of the powder lines 76, 78 in the magnet 24 relative to the first region axis 72. For example, curves 226a represent the area in the magnet 24 in which the powder lines 76, 78 are approximately at a 5 degree angle relative to each first region axis 72. Similarly curves 226b represent the area in the magnet 24 in which the powder lines 76, 78 are approximately at a 15 degree angle relative to each first region axis 72. Curves 226c represent an area where the magnetization lines 94, 96 are at a 25 degree angle relative to each first region axis 72. Curves 226d represent an approximate area where the powder lines 76, 78 are approximately at a 35 degree relative to each first region axis 72. Curves 120e represent an approximate area where the powder lines 76, 78 are approximately at a 45 degree angle relative to each first region axis 72. Curves 226f represent an approximate area in which the powder lines 76, 78 are approximately at a 55 degree angle relative to each first region axis 72. Curves 226g represent an approximate area where the powder lines 76, 78 are approximately at a 65 degree angle relative to each first region axis 72. Curves 226h represent an area where the powder lines 76, 78 are approximately at a 75 degree angle relative to each first region axis 72. Curves 226i represent an area where the powder lines 76, 78 are approximately at an 85 degree angle relative to each first region axis 72.

Figure 20C:
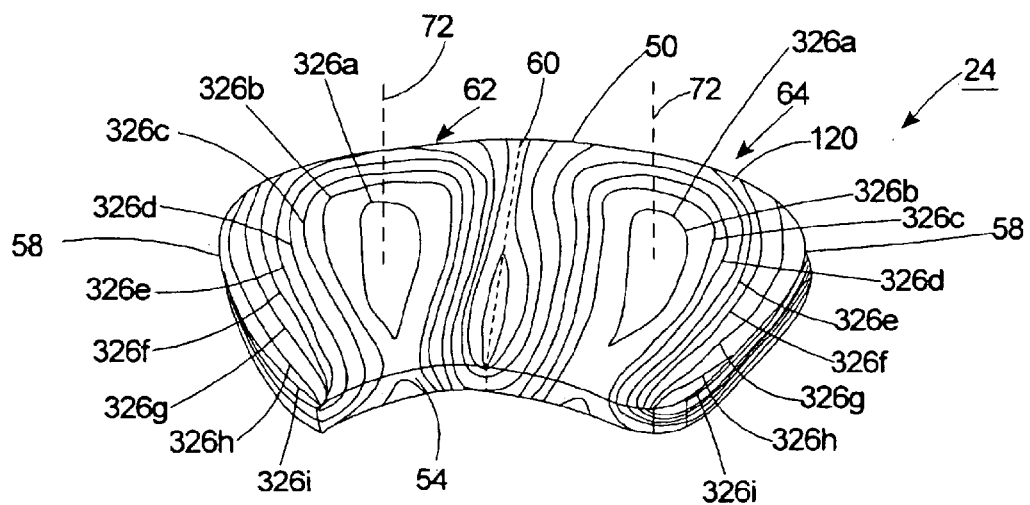
FIG. 20C is a top perspective illustration of a magnet including a plurality of curves which illustrate the orientation of the magnetization pattern.

Somewhat similarly, FIG. 20C illustrates a perspective view of a magnet 24 having a plurality of curves designated 326a–I which illustrate the shape of the magnetization pattern 26. More specifically, curves 326a–I illustrate the angle of the magnetization lines 94, 96 in the magnet 24 relative to the first region axis 72. For example, curves 326a represent the area in the magnet 24 in which the magnetization lines 94, 96 are approximately at a 5 degree angle relative to each first region axis 72. Similarly curves 326b represent the area in the magnet 24 in which the magnetization lines 94, 96 are approximately at a 15 degree angle relative to each first region axis 72. Curves 326c represent an area where the magnetization lines 94, 96 are at a 25 degree angle relative to each first region axis 72. Curves 326d represent an approximate area where the magnetization lines 94, 96 are approximately at a 35 degree relative to each first region axis 72. Curves 326e represent an approximate area where the magnetization lines 94, 96 are approximately at a 45 degree angle relative to each first region axis 72. Curves 326f represent an approximate area in which the magnetization lines 94, 96 are approximately at a 55 degree angle relative to each first region axis 72. Curves 326g represent an approximate area where the magnetization lines 94, 96 are approximately at a 65 degree angle relative to each first region axis 72. Curves 326h represent an area where the magnetization lines 94, 96 are approximately at a 75 degree angle relative to each first region axis 72. Curves 326i represent an area where the magnetization lines 94, 96 are approximately at an 85 degree angle relative to each first region axis 72.

Figure 21:
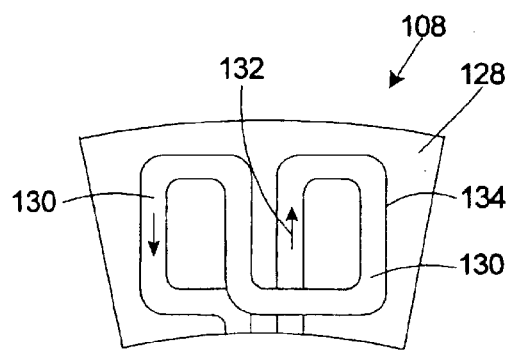
FIG. 21 is a cross-sectional view of the orientating device taken on lines 21—21 of FIG. 19.
Figure 22:
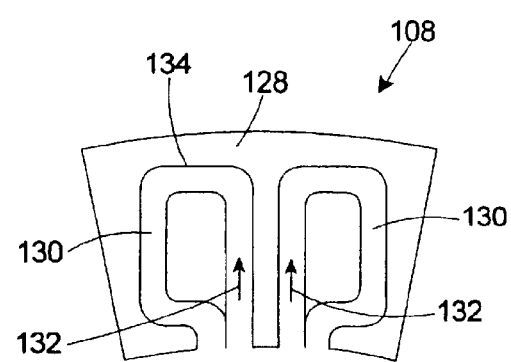
FIG. 22 is an alternate cross-sectional view of the orientating device.

FIGS. 21 and 22 each illustrate a separate embodiment of an orientating device 108 which can be used to generate the flux lines 110. In the embodiments illustrated in FIGS. 21 and 22, the orientating device 108 includes a housing 128 and a pair of spaced apart, adjacent orientating coils 130. In the embodiment illustrated, the orienting device 108 is positioned between the upper punch 104 and the upper side 12 of the fixture cavity 102. Further, the housing 128 is shaped somewhat similar to the magnet 24 and is rectangular, arch shaped.

Current 132 passing through the orientating coils 130 creates the flux lines 110 which orientate the magnet power 48. Thus, the shape of the orientating coils 130 varies according to the desired pattern of the flux lines 110. In the embodiments illustrated in FIGS. 21 and 22, each orientating coil 130 is shaped similar to a rectangular tube. Each orientating coil 130 can be made by creating a rectangular shaped channel 132 in the housing 128. Subsequently, one or more loops of conductive wire (not shown) and epoxy (not shown) can be wrapped within the channels 132 to form the orientating coils 130. The orientating coils 130, for example, can be arranged as either an interconnected pair of coils 130 (FIG. 21) or dual, independent coils 130 (FIG. 22). The two orientating coils 130 can be connected in series, as illustrated in FIG. 21, or in parallel, as illustrated in FIG. 22.

Preferably, the geometry of the orientating coils 130, and alignment of the flux lines 110, the alignment of the powder pattern 75, and the alignment of the magnetization pattern 26 are designed to have a particular geometric relationship to the geometry and movement of the actuator coil 22 in the actuator motor 20. Stated another way, the geometry of the orientating coils 130 is preferably related to the geometry and movement of the actuator coil 22. Moreover, the geometry of the orientating coils 130 and the resulting flux lines 110 can be altered to reflect the desired stroke of the actuator coil 22. This allows the designer of the actuator motor 20 to optimize the design of the magnet 24 for a given actuator coil 22 and a desired stroke of the actuator coil 22.

Figure 23:
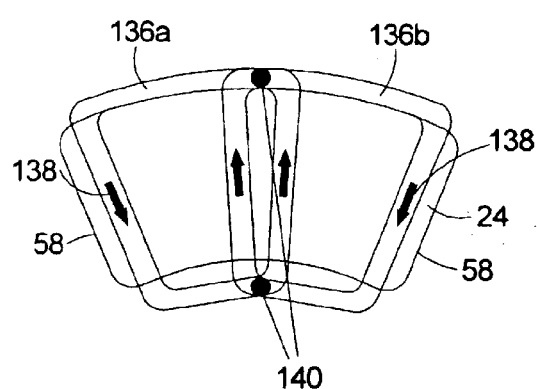
FIG. 23 is an illustration of a magnet and an actuator.
Figure 24:
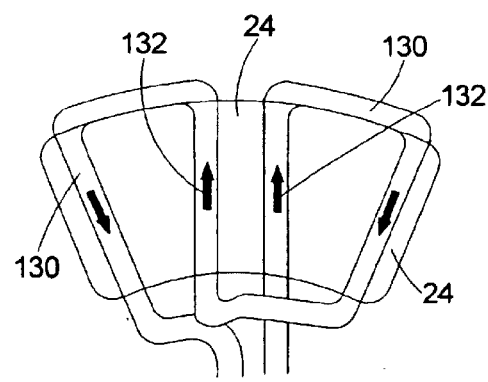
FIG. 24 is an illustration of an orientating device above a magnet.

The relationship between the geometry of the orientating coils 130 and the actuator coil 22 (not shown in FIGS. 23 and 24) can be better understood with reference to FIGS. 23 and 24. In particular, FIG. 23 illustrates a magnet 24 and a pair of dummy coils 136a,b. Each dummy coil 136a,b is shaped similar to the desired design of the actuator coil 22 (not shown in FIGS. 23 and 24). One of the dummy coils 136a,b is positioned to reflect the ends of the desired stroke. For an actuator motor 20 (not shown in FIGS. 23 and 24) designed for use through its entire range, one of the dummy coils 136a,b is positioned near each of the sides 58 of the magnet 24. More specifically, each dummy coil 136a, 136b is placed at each extreme movement position relative to the magnet 24 of the actuator coil 22. Next, an imaginary current 138 is directed through each dummy coil 136a, 136b in a different direction. Subsequently, overlapping regions 140 are eliminated in which the imaginary currents 138 would cancel. The geometry of the orientating coils 130 should be similar as possible to the remaining current carrying regions in the dummy coils 136a,b. FIG. 24 illustrates the resulting design of the orientating coils 130 relative to the magnet 24.

The magnet body 46 is preferably made of anisotropic NdBFe which is a strong permanent magnet. However, those skilled in the art will recognize that other materials can be utilized. For example, the unique process for manufacturing the magnet 24 allows for the use of less expensive materials, such as Samarium Cobalt or Ceramic Ferrite.

Figure 25:
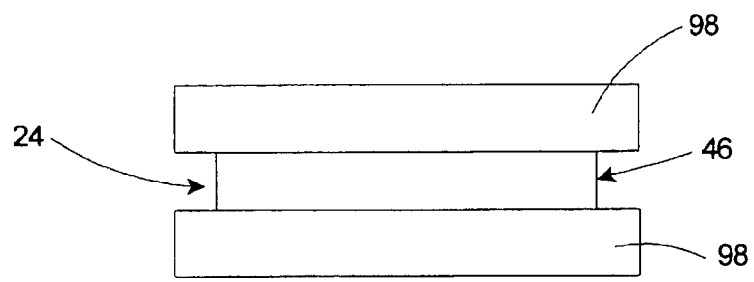
FIG. 25 is a side plan illustration of a magnetization fixture and magnet body having features of the present invention.

Referring to FIG. 25, the magnet body 46 can be subjected to the magnetization pattern 26 utilizing an impulse magnetizing process with a magnetizing fixture 98. The manufacturing of the appropriate magnetizing fixture 98 for magnetization of magnet body 46 may be accomplished using upper and lower magnetizing conductors, and/or shaped steel magnetizing yokes (not shown).

Figure 26:
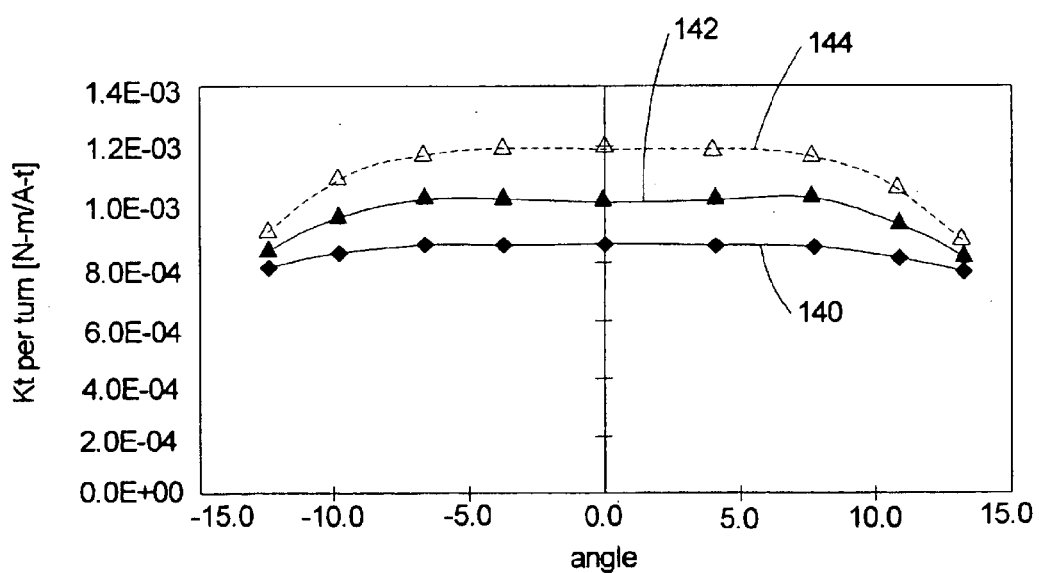
FIG. 26 is a graph which illustrates the performance characteristics of various magnets.

FIG. 26 illustrates comparison of the performance of three alternate magnets. In particular, curve designated 140 illustrates the performance of a prior art actuator motor 10P with the magnets 14P having parallel magnetization lines 18P as illustrated in FIG. 1A and the thickness of the flux return plates 16P and the magnets 14P optimized. Curve 142 illustrates the performance of an actuator motor 20 using a pair of magnets 24 made in accordance with the present invention. It should be noted that an approximately 11% increase in performance is realized over the prior art optimized actuator motor 10P. Finally, curve 144 illustrates the performance of actuator motor 20 having a pair of magnets 24 made in accordance with the present invention with the thickness of the magnets 24 and the flux return plates 25 reoptimized. It should be noted that an approximately 25% increase in performance is realized over the prior art optimized actuator motor 10P.

The distinguishing characteristic of the magnet 10 built in accordance with the present invention is the magnet powder 46 is aligned during manufacturing to have a powder pattern 75 which corresponds to the magnetization lines 94, 96 in the magnetization pattern 26.

Importantly, each magnet 24 is made utilizing a unique manufacturing process and the magnet 24 includes a unique magnetization pattern 26. The magnetization pattern 26 results in higher magnetic flux densities at the sides 54, 56, 58 of the magnet 24, higher average magnetic flux densities. The higher magnetic flux densities create higher seek forces for quicker data seek times.

Additionally, the higher magnetic flux densities at the sides 54, 56, 58 of the magnet body 46, i.e. a greater radius, results in higher torques on the actuator coil 22 of the actuator motor 20. This enables the magnet 24 to generate more force from a given amount of current in the coil 22 and increases the efficiency of the actuator motor 20. This also reduces the amount of power consumed by the actuator motor 20, reduces the amount of heat and noise generated by the actuator motor 20 during operation and increases operational time of the actuator motor 20 for a given battery charge. Further, the size of the magnet 24 can be reduced for a given force requirement. These considerations are particularly important for computer disk drives 10, which often operate in heat and noise sensitive environments, or on battery power.

While the particular manufacturing fixture 11 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A manufacturing fixture for manufacturing a magnet from a magnet powder, the magnet including a north pole, a south pole and a first region axis which extends between the north pole and the south pole, the manufacturing fixture comprising:

a fixture body including a fixture cavity for receiving the magnet powder, the fixture cavity having a cavity axis which is substantially parallel with the first region axis when the magnet powder is in the fixture cavity, the fixture cavity including a first region; and an orientating device adapted to create a magnetic field having flux lines which extend through a portion of the fixture cavity, wherein a portion of the flux lines in the first region of the fixture cavity align a portion of the magnet powder to be substantially parallel to the cavity axis, and a portion of the magnet powder to be angled relative to the cavity axis.

2. The fixture of claim 1 wherein a portion of the flux lines in the fixture cavity extend substantially transversely to the cavity axis.

3. The fixture of claim 1 wherein the fixture cavity includes a first cavity segment, a second cavity segment and a cavity transition between the first cavity segment and the second cavity segment, wherein a portion of the flux lines near the cavity transition extend substantially transversely to the cavity axis.

4. The fixture of claim 3 wherein a portion of the flux lines in the fixture cavity are substantially parallel with the cavity axis.

5. The fixture of claim 1 wherein a portion of the flux lines in the cavity fixture positioned near a cavity perimeter are angled relative to the cavity axis.

6. The fixture of claim 1 wherein a portion of the flux lines in the fixture cavity are substantially parallel with the cavity axis.

7. The fixture of claim 1 wherein the flux lines in the cavity fixture near a cavity perimeter are angled relative to the cavity axis.

8. The fixture of claim 1 wherein the fixture cavity indudes an upper side and a lower side that are positioned substantially perpendicular to the cavity axis, and the orientating device includes a coil positioned near one of the sides of the fixture cavity.

9. The fixture of claim 8 wherein the orientating device includes a pair of spaced apart, adjacent coils positioned near one of the sides of the fixture cavity.

10. The fixture of claim 1 including an upper punch which is adapted to move relative to the fixture body and compress the magnet powder in the fixture cavity and the orientating device is positioned near the upper punch.

11. A fixture for manufacturing a permanent magnet, the permanent magnet having a magnet body which is made of a magnet powder, the magnet body having a first segment which includes a first region and a second region, the first region having a first region axis which extends between a north pole and a south pole of the first region, the fixture comprising:

a fixture body including a fixture cavity which is adapted to receive the magnet powder; and an orientating device adapted for aligning a portion of the magnet powder in the fixture cavity to form a powder pattern in the magnet body having second region powder lines in at least a portion of the second region which are angled relative to the first region axis.

12. The fixture of claim 11 wherein the orientating device is adapted to align a portion of the magnet powder so that the powder pattern has first region powder lines in at least a portion of the first region of the magnet which are substantially parallel with the first region axis.

13. The fixture of claim 11 wherein the fixture cavity has a cavity axis which is substantially parallel to the first region axis; wherein the orientating device is adapted to create flux lines which extend into the fixture cavity.

14. The fixture of claim 13 wherein the fixture cavity includes a first cavity segment, a second cavity segment and a cavity transition between the first cavity segment and the second cavity segment, wherein a portion of the flux lines near the cavity transition extend substantially transversely to the cavity axis.

15. The fixture of claim 14 wherein at least a portion of the flux lines in the fixture cavity are substantially parallel with the cavity axis.

16. The fixture of claim 15 wherein at least a portion of the flux lines in the fixture cavity near a cavity perimeter of the fixture cavity are angled relative to the cavity axis.

17. The fixture of claim 13 wherein at least a portion of the flux lines in the fixture cavity are substantially parallel with the cavity axis.

18. The fixture of claim 13 wherein at least a portion of the flux lines in the cavity fixture near a cavity perimeter are angled relative to the cavity axis.

19. The fixture of claim 11 wherein the orientating device includes a pair of spaced apart, adjacent coils positioned near one of the sides of the fixture cavity.

20. A fixture for manufacturing a magnet from a magnet powder, the magnet including a north pole, a south pole and a first region axis, the first region axis extending between the north pole and the south pole, the fixture comprising:
a fixture body including defining a fixture cavity that receives the magnet powder, the fixture cavity having a first side and a second side opposite the first side; and
an orientating device that is positioned near only one side of the fixture cavity, the orientating device creating a magnetic field having flux lines that extend into the fixture cavity, wherein a portion of the flux lines in the fixture cavity are angled relative to the first region axis when the magnet powder is in the fixture cavity.

21. The fixture of claim 20 wherein a portion of the flux lines in the fixture cavity extend transversely relative to the first region axis when the magnet powder is in the fixture cavity.

22. The fixture of claim 20 wherein the fixture cavity includes a first cavity segment, a second cavity segment and a cavity transition between the first cavity segment and the second cavity segment, wherein the flux lines near the cavity transition extend transversely to the first region axis when the magnet powder is in the fixture cavity.

23. The fixture of claim 22 wherein a portion of the flux lines in the fixture cavity are parallel with the first region axis when the magnet powder is in the fixture cavity.

24. The fixture of claim 23 wherein the flux lines in the cavity fixture near a cavity perimeter are angled relative to the first region axis when the magnet powder is in the fixture cavity.

25. The fixture of claim 20 wherein a portion of the flux lines in the fixture cavity are parallel with the first region axis when the magnet powder is in the fixture cavity.

26. The fixture of claim 20 wherein the flux lines in the cavity fixture near a cavity perimeter are angled relative to the first region axis when the magnet powder is in the fixture cavity.

27. A method for manufacturing a magnet using a magnet powder, the magnet including a north pole, a south pole and a first region axis which extends between the north pole and the south pole, the method comprising the steps of:
providing a fixture cavity;
positioning the magnet powder in the fixture cavity; and
creating flux lines which extend into the fixture cavity, wherein a portion of the flux lines in the fixture cavity align a portion of the magnet powder to be angled relative to the first region axis.

28. The method of claim 27 wherein the step of creating flux lines includes the step of creating flux lines in the fixture cavity which extend substantially transversely to the first region axis.

29. The method of claim 27 wherein the step of providing a fixture cavity includes providing a fixture cavity having a first cavity segment, a second cavity segment and a cavity transition between the first cavity segment and the second cavity segment, and the step of creating flux lines includes creating flux lines near the transition which extend substantially transversely to the first region axis.

30. The method of claim 29 wherein the step of creating flux lines includes creating flux lines in the fixture cavity which are substantially parallel with the first region axis.

31. The method of claim 30 wherein the step of creating flux lines includes creating flux lines in the cavity fixture near a cavity perimeter which are angled relative to the first region axis.

32. The method of claim 27 wherein the step of creating flux lines includes creating flux lines in the fixture cavity near a cavity perimeter which are angled relative to the first region axis.

33. The fixture of claim 11 wherein the orientating device is adapted to align a portion of the magnet powder so that the powder pattern has first region powder lines in at least a portion of the first region of the magnet, and wherein the orientating device is adapted to create flux lines which extend into the fixture cavity.

34. The fixture of claim 11 wherein the fixture cavity has a cavity axis which is substantially parallel to the first region axis.

35. The fixture of claim 34 wherein the fixture cavity includes a first cavity segment, a second cavity segment and a cavity transition between the first cavity segment and the second cavity segment, wherein a portion of the flux lines near the cavity transition extend approximately transversely to the cavity axis.

36. The fixture of claim 35 wherein at least a portion of the flux lines in the fixture cavity are parallel to the cavity axis.

37. The fixture of claim 36 wherein at least a portion of the flux lines in the fixture cavity near a cavity perimeter of the fixture cavity are angled relative to the cavity axis.

38. The fixture of claim 34 wherein at least a portion of the flux lines in the fixture cavity are parallel to the cavity axis, and wherein at least a portion of the flux lines in the cavity fixture near a cavity perimeter are angled relative to the cavity axis.

39. The fixture of claim 20 the orientating device includes a coil positioned near one of the sides of the fixture cavity.

40. The fixture of claim 39 wherein the orientating device includes a pair of spaced apart, adjacent coils positioned near one of the sides of the fixture cavity.

41. The fixture of claim 20 including an upper punch that is positioned near the orientating device, the upper punch being adapted to move relative to the fixture body and compress the magnet powder in the fixture cavity.

42. A fixture for manufacturing a magnet from a magnet powder, the manufacturing fixture comprising:
a fixture body defining a fixture cavity for receiving the magnet powder, the fixture cavity having a cavity axis, the fixture cavity including an upper side and a lower side that are positioned substantially perpendicular to the cavity axis, the upper side and the lower side being substantially planar; and
an orientating device positioned near only one of the sides of the fixture cavity, the orientating device generating a magnetic field having flux lines which extend through a portion of the fixture cavity, wherein a portion of the flux lines in the fixture cavity are angled relative to the remaining flux lines in the fixture cavity.

43. The fixture of claim 42 wherein a portion of the flux lines in the fixture cavity extend substantially transversely to at least a portion of the remaining flux lines in the fixture cavity.

44. The fixture of claim 42 wherein the fixture cavity includes a first cavity segment, a second cavity segment and a cavity transition between the first cavity segment and the second cavity segment, wherein a portion of the flux lines near the cavity transition extend substantially transversely to at least a portion of the remaining flux lines in the fixture cavity.

45. The fixture of claim 42 wherein the fixture cavity includes an upper side and a lower side and the orientating device includes a coil positioned near one of the sides of the fixture cavity.

46. The fixture of claim 45 wherein the orientating device includes a pair of spaced apart, adjacent coils positioned near one of the sides of the fixture cavity.

47. The fixture of claim 42 including an upper punch positioned near the orientating device, the upper punch being adapted to move relative to the fixture body and compress the magnet powder in the fixture cavity.

48. A manufacturing fixture for manufacturing a magnet using a magnet powder, the magnet including a north pole, a south pole and a first region axis, the first region axis extending between the north pole and the south pole, the manufacturing fixture comprising:
an upper punch;
a lower punch;
a fixture body positioned between the upper punch and the lower punch, the fixture body defining a fixture cavity that receives the magnet powder; and
an orientating device that is positioned between the upper punch and the lower punch, the orientating device creating a magnetic field having flux lines that extend through the fixture cavity, wherein a portion of the flux lines in the fixture cavity are angled relative to the first region axis when the magnet is in the fixture cavity.

49. The fixture of claim 48 wherein a portion of the flux lines in the fixture cavity extend transversely relative to the first region axis when the magnet is in the fixture cavity.

50. The fixture of claim 48 wherein the fixture cavity includes a first cavity segment, a second cavity segment and a cavity transition between the first cavity segment and the second cavity segment, wherein the flux lines near the cavity transition extend transversely to the first region axis when the magnet is in the fixture cavity.

51. The fixture of claim 50 wherein a portion of the flux lines in the fixture cavity are parallel with the first region axis when the magnet is in the fixture cavity.

52. The fixture of claim 51 wherein the flux lines in the cavity fixture near a cavity perimeter are angled relative to the first region axis when the magnet is in the fixture cavity.

53. The fixture of claim 48 wherein a portion of the flux lines in the fixture cavity are parallel with the first region axis when the magnet is in the fixture cavity.

54. The fixture of claim 48 wherein the flux lines in the cavity fixture near a cavity perimeter are angled relative to the first region axis when the magnet is in the fixture cavity.

55. The fixture of claim 48 wherein the fixture cavity includes an upper side and a lower side that each are positioned substantially perpendicular to the cavity axis, and the orientating device includes a coil positioned near one of the sides of the fixture cavity.

56. The fixture of claim 55 wherein the orientating device includes a pair of spaced apart, adjacent coils positioned near one of the sides of the fixture cavity.

57. The fixture of claim 48 wherein one of the punches moves relative to the fixture body and compresses the magnet powder in the fixture cavity.

58. A manufacturing fixture for manufacturing a magnet using a magnet powder, the magnet including a north pole, a south pole and a first region axis, the first region axis extending between the north pole and the south pole, the manufacturing fixture comprising:
an upper punch;
a lower punch;
a fixture body defining a fixture cavity that receives the magnet powder; and
an orientating device that is at least partially positioned directly between the upper punch and the lower punch, the orientating device creating a magnetic field having flux lines that extend through the fixture cavity, wherein a portion of the flux lines in the fixture cavity are angled relative to the first region axis when the magnet powder is in the fixture cavity.

59. The fixture of claim 58 wherein a portion of the flux lines in the fixture cavity extend transversely relative to the first region axis when the magnet powder is in the fixture cavity.

60. The fixture of claim 58 wherein the fixture cavity includes a first cavity segment, a second cavity segment and a cavity transition between the first cavity segment and the second cavity segment, wherein the flux lines near the cavity transition extend transversely to the first region axis when the magnet powder is in the fixture cavity.

61. The fixture of claim 60 wherein a portion of the flux lines in the fixture cavity are parallel with the first region axis when the magnet powder is in the fixture cavity.

62. The fixture of claim 61 wherein the flux lines in the cavity fixture near a cavity perimeter are angled relative to the first region axis when the magnet powder is in the fixture cavity.

63. The fixture of claim 58 wherein a portion of the flux lines in the fixture cavity are parallel with the first region axis when the magnet powder is in the fixture cavity.

64. The fixture of claim 58 wherein the flux lines in the cavity fixture near a cavity perimeter are angled relative to the first region axis when the magnet powder is in the fixture cavity.

65. The fixture of claim 58 wherein the fixture cavity includes an upper side and a lower side that each are positioned substantially perpendicular to the cavity axis, and the orientating device includes a coil positioned near one of the sides of the fixture cavity.

66. The fixture of claim 65 wherein the orientating device includes a pair of spaced apart, adjacent coils positioned near one of the sides of the fixture cavity.

67. The fixture of claim 58 wherein one of the punches moves relative to the fixture body and compresses the magnet powder in the fixture cavity.

68. The fixture of claim 58 wherein the portion of the flux lines are angled by at least approximately five degrees relative to the first region axis.

69. The fixture of claim 58 wherein the portion of the flux lines are angled by at least approximately 15 degrees relative to the first region axis.

70. The fixture of claim 11 wherein the second region powder lines are angled by at least approximately five degrees relative to the first region axis.

71. The fixture of claim 11 wherein the second region powder lines are angled by at least approximately 15 degrees relative to the first region axis.

72. The fixture of claim 20 wherein the portion of the flux lines are angled by at least approximately five degrees relative to the first region axis.

73. The method of claim 27 wherein the step of creating flux lines includes creating flux lines that angle the portion of the magnet powder by at least approximately five degrees relative to the first region axis.

74. The method of claim 27 wherein the step of creating flux lines includes creating flux lines that angle the portion of the magnet powder by at least approximately 15 degrees relative to the first region axis.

75. The fixture of claim 48 wherein the portion of the flux lines are angled by at least approximately five degrees relative to the first region axis.

\* \* \* \* \*